UNITED STATES PATENT OFFICE.

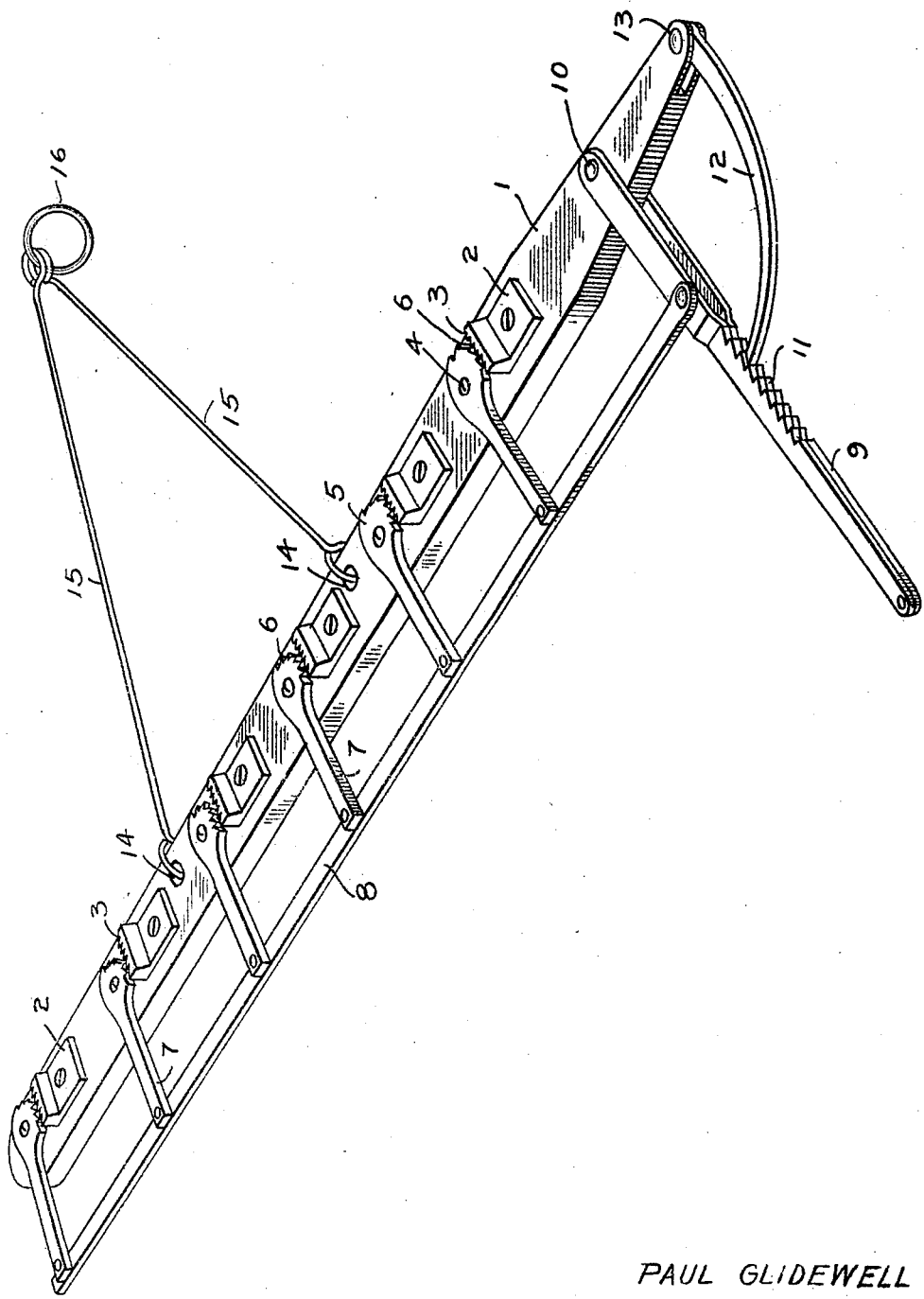

PAUL GLIDEWELL, OF MILAN, MISSOURI.

CLAMP.

1,371,888.     Specification of Letters Patent.     Patented Mar. 15, 1921.

Application filed June 5, 1920. Serial No. 386,721.

*To all whom it may concern:*

Be it known that I, PAUL GLIDEWELL, a citizen of the United States, residing at Milan, in the county of Sullivan and State of Missouri, have invented new and useful Improvements in Clamps, of which the following is a specification.

The present invention has reference to a wire clamping means designed for use in connection with a wire stretcher in the erection of fences or the like.

The primary object is to produce a very simple means whereby any desired number of line wires may be gripped and effectively held for operation by the puller, and as readily released when stapled to a post or the like.

A still further object of the invention is to produce a line wire clamp for wire pulling devices that shall be of a simple construction, cheaply manufactured, easily operated, and thoroughly efficient in operation.

The foregoing objects, and others which will appear as the nature of the invention is better understood, may be accomplished by a construction, combination and operative arrangement of parts such as is disclosed by the drawings.

The drawing illustrates a perspective view of the improvement.

As disclosed by the drawing I make use of a body member in the nature of a plate 1. This plate, upon one of its faces, and at determined spaced intervals is formed with lugs or projections 2. Each of the lugs has one of its edges roughened or formed with teeth 3. Pivotally secured, as at 4, to the plate 1 adjacent to the toothed edge of each of the lugs 2 is a dog 5. Each dog has a roughened or toothed engaging face 6 which is disposed to coöperate with the teeth 3 of the respective lugs 2. Each dog is provided with an extension in the nature of a bail 7, and pivotally secured to the bail portions of the dogs is a rod 8. The upper end of this rod 8 is loose or pivotally connected to a lever 9, and the lever is in turn pivotally secured, as at 10 to the plate 1. The lever has its outer edge formed with spaced teeth 11, and these teeth are designed to be engaged by the active face or end of a pawl 12 that is pivoted to the upper or outer end of the plate 1 as at 13.

The plate 1, approximately at points preferably equidistantly located from the center thereof has secured thereto, as at 14, rod members 15 that are connected at their outer ends by a ring 16, and this ring is designed to be attached to the pulling device.

In operation the pawl 12 is brought out of engagement with the toothed surface of the lever 9 which is swung upon its pivoted connection with the plate 1 to swing the dogs 5 to bring the toothed face thereof away from the toothed edges of the lugs 2, so that the line wires may be arranged between the dogs and lugs. The lever is then swung in an opposite direction to bring the dogs into engagement with the wires to force the same against the lugs. The pawl is then swung over the lever and brought into engagement between the teeth thereof, thus locking the dogs in wire engaging position.

It is believed that the foregoing description, when taken in connection with the drawing will fully set forth the simplicity, advantages, and operation of the improvement.

Having thus described the invention, what I claim is:—

The herein described construction of clamps for line wires, including a plate having a bifurcated end and having angle lugs secured in spaced relation on one face of the plate, and the angle portion of each of the lugs having its outer face serrated, a toothed dog pivoted on the plate adjacent the serrated face of each of said lugs, a rod to which each of the dogs is pivotally connected, a lever having a bifurcated end which straddles and which is pivotally connected to the plate adjacent to the bifurcated end of the latter, a pivotal connection between the lever and rod, said lever having its outer face toothed, and a curved pawl pivoted in the bifurcated end of the plate for engaging with the teeth of the lever for holding the active face of the dogs at determined relation to the active or roughened faces of the lugs.

In testimony whereof I affix my signature.

PAUL GLIDEWELL.